Nov. 18, 1952 — G. W. HEYDER — 2,618,004
COMBINED PAINT SCRAPER AND FLAME GUARD
Filed July 25, 1950 — 2 SHEETS—SHEET 1

Inventor:
George W. Heyder,
BY Harry B. Cook
Attorney.

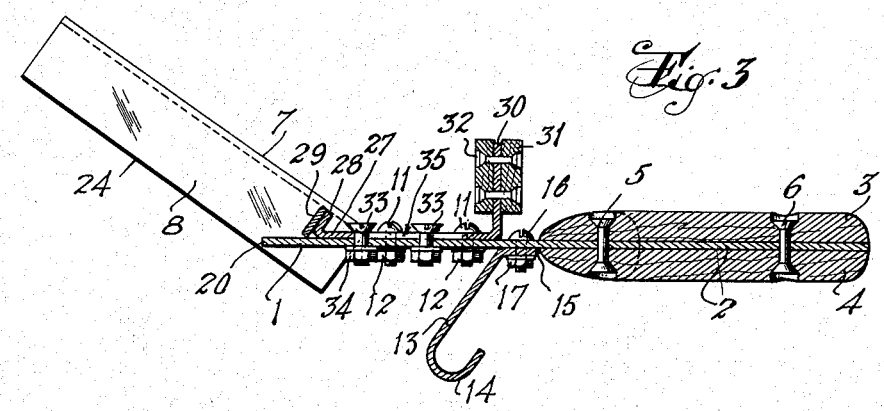
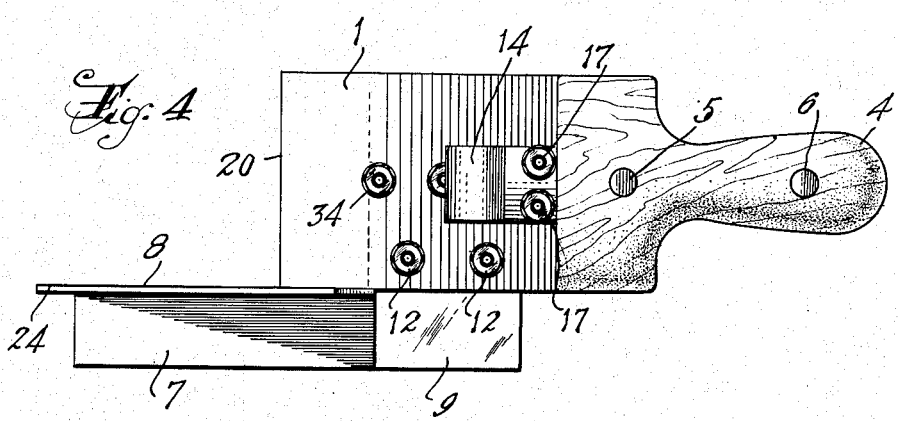
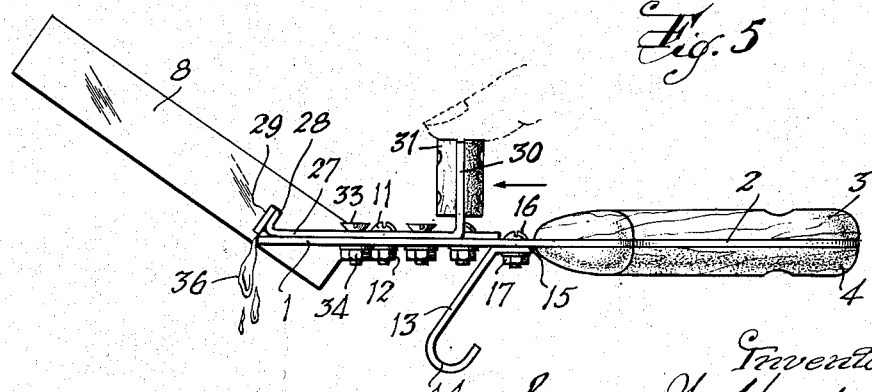

Patented Nov. 18, 1952

2,618,004

UNITED STATES PATENT OFFICE 2,618,004

COMBINED PAINT SCRAPER AND FLAME GUARD

George W. Heyder, Winfield Park, N. J.

Application July 25, 1950, Serial No. 175,738

3 Claims. (Cl. 15—236)

The invention relates generally to paint scrapers with attachments and more particularly to a combined paint scraper, flame guard and scraper blade cleaner.

During the operation of removing a coat of paint from a painted surface the coat is often heated by a flame from a nozzle or the like in order to soften and loosen it. This is dangerous practice especially when removing paint from a clapboard siding as the flame is liable to be blown under the clapboards causing damage by fire.

Furthermore, when the paint is softened by the heat, the scraped off softened paint is liable to accumulate on the edge of the scraping blade thereby making the blade ineffectual.

It is therefore a prime object of the present invention to provide a paint scraper with a guard for concentrating the flame to the area to be scraped and preventing it from spreading to adjacent areas.

Another object of the present invention is to provide a paint scraper with means for cleaning off the accumulation of scraped off paint from the edge of the scraping blade.

A further object of the invention is to provide a paint scraper with means for guiding and supporting the scraping blade in balanced position during the scraping operation.

Still another object is to provide a device of this kind that is simple and rugged in construction, economical to manufacture and safe in operation.

Other objects and advantages of the invention will be apparent from the description thereof to follow taken in connection with the accompanying drawings in which—

Figure 3 is a vertical sectional view of the combined paint scraper, flame guard and scraping blade cleaner of Figure 1.

Figure 4 is a bottom plan view thereof.

Figure 5 is a side elevational view thereof showing the scraping blade edge cleaner in operative position.

Figure 1:
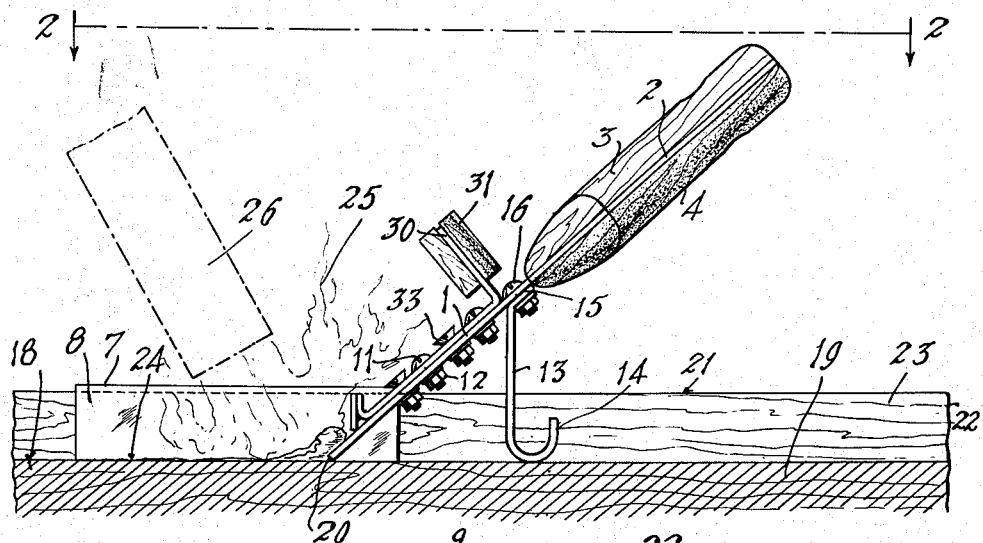
Figure 1 is a side elevational view of a combined paint scraper, flame guard and scraping blade cleaner embodying my invention in operative position on a clapboard siding and showing a flame producing nozzle in dotted lines.

Referring to the drawings, the paint scraper consists of a rectangular-shaped metal plate having a flat portion forming a scraping blade 1. The blade has a central extension at one end forming a handle portion 2. Both surfaces of the handle portion and of the adjacent blade are covered with substantially flat wooden handle portions 3 and 4 secured to the blade and handle portion by rivets 5 and 6, respectively.

Figure 7:
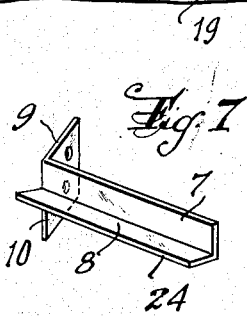
Figure 7 is a reduced perspective view of the flame guard removed from the scraper.
Figure 6:
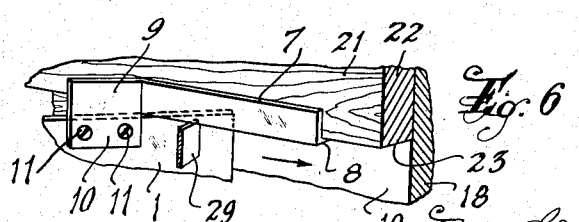
Figure 6 is a reduced fragmentary perspective view of a modification of the invention with the parts reversed and showing the flame guard in operative position on a clapboard.

A flame guard is secured to one side of the blade 1, midway its ends, and comprises an angle plate of sheet metal including a top flange 7 and a side flange 8 as viewed in Figure 7 directly connected to the flange 7 at an angle thereto. One end of the top flange 7 is provided with an integrally formed mounting wing 9 bent obliquely to the plane of the body of flange 7 and extending laterally beyond the juncture between the top and side flanges as indicated at 10.

The lateral extension 10 of wing 9 is secured flatwise on the upper surface of the blade 1 by spaced bolts passing through aligned openings in the blade and extension and by nuts 12, 12. When the wing is thus secured to the blade, the angle plate projects at an obtuse angle to the plane of the body of the blade 1 as shown in Figures 3 and 5, and forms an extension of the blade along one side thereof with its side flange 8 positioned along and abutting against the adjacent side edge of the blade. In other words, the flange 8 is disposed at one end of the scraping edge 20 of the blade in a plane substantially perpendicular to said edge with its longitudinal edge that is opposite the flange 7 flush with said scraping edge and disposed at an angle to the plane of said scraping blade.

A narrow metal support-guide plate 13 having a looped lower end 14 and a top end 15 disposed at an angle to the plane of the body of the plate is secured to the under surface of the blade 1 centrally thereof and adjacent its handle portions by bolts 16, 16 and nuts 17, 17. When so secured, the plate 13 extends downwardly of the blade and forwardly of the handle portions as viewed in Figure 5, with the looped lower end 14 in a common plane with the scraping edge 20 and the free longitudinal edge 24 of the flange 8 of the flame guard. This plate serves to support the scraper in balanced position and to guide it during scraping operation.

In scraping paint from the painted surface 18 of a clapboard 19, for example, the scraper is positioned so that the operative edge 20 of the blade 1 is in contact with said painted surface. At this time, the blade is disposed at an angle to the plane of said painted surface as shown in Figure 1, and the plate 13 depends truly vertical with its looped end 14 supporting the scraper in balanced position and in position to guide the scraper when moved by the handle during the scraping operation. The blade of the flame guard is placed against the clapboard 19 with the top flange 7 thereof resting on and embracing the top or outer surface 21 of the next upper clapboard 22 of the siding, and with the side flange 8 thereof fitting snugly and embracing the lower side edge 23 of said clapboard 22, the lower edge of said flange 8 resting on the painted surface of clapboard 19 thus sealing the opening or space at the junction between the adjoining clapboards.

When the scraper is thus positioned operatively as viewed in Figure 1, flame 25 is applied to the painted surface 18 by a nozzle 26 or other device at a point ahead of the scraping blade 1 whereby the paint on said surface is softened and loosened by the heat of the flame in readiness for easy removal by the scraping blade 1. When the paint is sufficiently softened, the edge 20 of the blade 1 is pushed under said paint scraping it off the surface and forcing it upwardly onto the surface of the blade as shown in Figure 1. The side flange 8 of the flame guard will confine the flame to the surface being scraped and prevent it from spreading under the adjacent upper clapboard 22 and thus prevent damage by fire.

Figure 2:
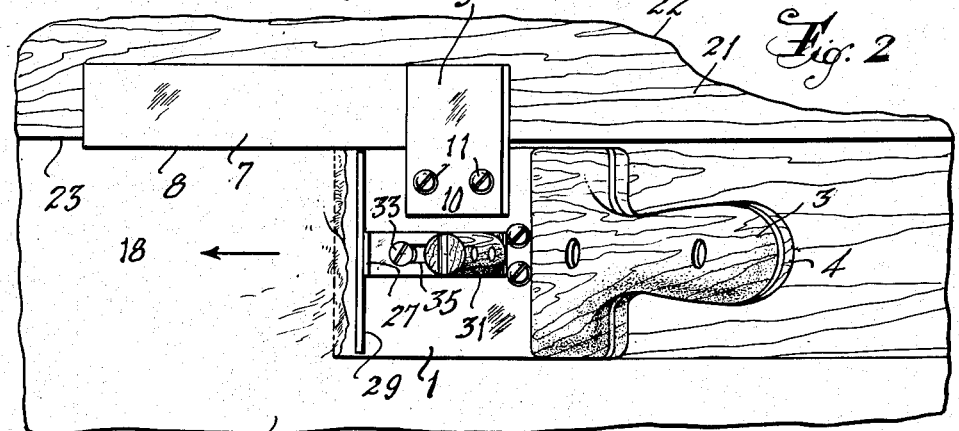
Figure 2 is a view looking down on top of the device in the direction of the arrows of Figure 1.

During the scraping operation as aforesaid, the scraped off paint is liable to accumulate on the blade 1 particularly adjacent the operative edge 20 thereof making said edge ineffectual. I have made provision for removing such accumulation of scraped off paint when necessary. For this purpose, an arm member 27 is positioned flatwise on the upper surface of the blade 1 and slidably mounted lengthwise and centrally thereof. At one end the arm member is formed with a short flange 28 extending at an acute angle to the body of the arm member. Secured to the outer surface of flange 28 by welding or otherwise is a narrow cleaning blade 29 extending across the width of the blade 1 adjacent its operative edge 20 as shown in Figure 2. At its other end the arm member is formed with a long flange 30 extending at right angles to the body of the arm member. A two-part wooden finger-piece or handle 31 is supported by and secured to flange 30 by rivets 32 for actuating the sliding arm member. The arm member is guided in its sliding movement and connected to the blade 1 by bolts 33, 33 fastened to blade 1 by nuts 34, 34 and extending through an elongated slot 35 in the center of the arm member. The cleaning blade 29 is normally positioned inwardly of the operative edge 20 of blade 1 as shown in Figure 1.

When it is desired to remove a supply of accumulated scraped off paint, the arm member 27 is slid outwardly toward the edge 20 of the blade by handle 31 and the accumulated scraped off paint pushed off of said edge as shown at 36 in Figure 5.

It will be seen from the above, that I have provided a paint scraper with means for effectively preventing the flame from spreading and causing damage but such means does not prevent the normal operation of the scraping blade.

Changes in details of construction might be made without departing from the principle of the invention.

What I claim is:

1. The combination of a flat scraping blade having a scraping edge to engage a surface to be scraped, and a flame guard secured on said scraping blade and having two elongate, angularly related, flanges joined along longitudinal edge portions thereof, one of said flanges being disposed at one end of and in a plane substantially perpendicular to said scraping edge with its longitudinal edge that is opposite the other flange flush with said scraping edge and disposed at an angle to the plane of said scraping blade.

2. The combination as defined in claim 1 wherein the second-mentioned flange of said flame guard has an integral lateral mounting wing at one end obliquely disposed to said second-mentioned flange and overlying and fastened to said scraping blade for securing said flame guard to said scraping blade.

3. The combination as defined in claim 1 with the addition of a support-guide plate secured on said scraping blade with one end in a common plane with said scraping edge and said longitudinal edge of said flange of the flame guard.

GEORGE W. HEYDER.

REFERENCES CITED

The following references are of record in the file of this patent:

UNITED STATES PATENTS

| Number | Name | Date |
| --- | --- | --- |
| 438,953 | Shaw | Oct. 21, 1890 |
| 769,191 | Sipe et al. | Sept. 6, 1904 |
| 1,259,553 | Perkins | Mar. 19, 1918 |
| 1,553,151 | Edwards | Sept. 8, 1925 |
| 2,133,922 | Laskin | Oct. 18, 1938 |
| 2,231,267 | Giddings | Feb. 11, 1941 |
| 2,467,327 | McKee | Apr. 12, 1949 |

FOREIGN PATENTS

| Number | Country | Date |
| --- | --- | --- |
| 8,291 | Great Britain | of 1886 |